Reissued July 16, 1935 Re. 19,647

UNITED STATES PATENT OFFICE 19,647

METHOD OF AND EXPLOSIVE FOR BLASTING DEEP WELL HOLES

John M. Jeffries, Wilmington, Del., assignor to Atlas Powder Company, Wilmington, Del., a corporation of Delaware No Drawing. Original No. 1,948,583, dated February 27, 1934, Serial No. 579,988, December 9, 1931. Application for reissue March 28, 1935, Serial No. 13,534

18 Claims. (Cl. 102—6)

My invention relates to improvements in methods of, and explosives for, blasting deep well holes. It is applicable where there is a heavy pressure of air, water, oil or other gas or liquid upon the explosive used. More particularly it relates to blasting oil and gas wells surely and effectively and to providing improved explosive assemblies for the various purposes named.

Well holes as deep as 9000 feet are known and deeper ones are likely in the future. High temperatures are usually encountered. It is obvious, therefore, that severe pressure and temperature conditions are imposed upon explosives in this field of use.

Ordinarily gelatinous explosives are used and this invention is restricted to high grade gelatinous explosives in which the content of nitroglycerine or other liquid explosive is 50% or greater. In this work blasting effectiveness is dependent upon the detonating wave of the gelatinous explosive propagating throughout the entire charge at the maximum rate of detonation. Instances of poor effectiveness and partially burning charges have been known with the types of gelatinous explosives now in use.

It is known in the explosives industry that gelatinous explosives lose their propagation sensitiveness rapidly when subjected to a vacuum, high pressure, high temperatures or rapid temperature changes. Even too much pressure in the normal packing operation at the factory can result in a product of lowered sensitivity to propagation. Obviously, in a long vertical charge even the weight of the gelatinous explosive upon itself can result in a similar condition.

Each of the several conditions mentioned above, to which gelatinous explosives are subjected is thought to exert its effect through the removal of air from the explosive. For instance, if a gelatinous explosive having high propagation sensitiveness is submitted to any of the conditions mentioned it will be found to have increased in density and to have become less sensitive to propagation. A gelatinous explosive is conceived to have air stirred into it during manufacture and this air exists in the finished product in the form of minute bubbles. The plastic walls of these bubbles collapse under the influence of the severe conditions cited above and air is forced from the explosive.

From the very nature of gelatinous explosives and the causes and effects cited, it seemed that the gelatinous explosive itself could not be modified to obviate this difficulty. Accordingly, my object, which is to provide more positive, continuous, brisant explosive action from gelatinous explosives and to assure a higher order of detonation from top to bottom of the column of explosive, must be accomplished in other ways.

I have found that granular, non-gelatinized dynamites, or even partially gelatinized explosives which might be called semi-gelatins, are not nearly so rapidly decreased in propagation sensitiveness by the conditions previously cited. I am of the opinion that any explosive has a critical pressure above which its propagation sensitiveness is affected and insufficient aeration may be a partial cause at least. However, in granular, non-gelatinized explosives or in semi-gelatins the walls of the air cells are solid materials largely and not so easily collapsed as is the case when the cell walls consist preponderantly of plastic gelatinized nitrocellulose.

Accordingly, my problem was answered by, and my invention consists in, providing a core of granular, non-gelatinized or semi-gelatinized dynamite in my gelatin of 50% or more nitroglycerin content or liquid substitutes. Ordinarily such explosives would not be satisfactory for deep well holes because of relatively poor resistance to the penetration of such liquids as water or oil, because their non-plastic nature might prevent their shape adapting itself to fill torpedoes or the holes thoroughly, because of lower density and in some cases of greater hazard in handling under severe conditions.

The explosive within the types mentioned which has the greatest propagation sensitiveness is the so-called straight nitroglycerine dynamite. Accordingly, I prefer to use within my gelatins, a core of 60% straight nitroglycerine dynamite. However, other straight dynamites are almost equally satisfactory. While I have expressed a preferred method, it will be understood that my invention includes a core of any non-gelatinous or semi-gelatinous explosive in a gelatinous explosive of 50% or more nitroglycerine content or equivalent explosive, whether said equivalent is liquid in itself or liquid because it is soluble in nitroglycerine. For instance, trinitrotoluene is a solid at ordinary temperatures, yet it may be dissolved in nitroglycerine to form a liquid mass.

I am aware that cores of more sensitive explosive have been proposed for aiding the explosion or detonation of low explosives such as black powder and insensitive high explosives such as chlorate powders. I am also aware that T. N. T. fuse, the so-called Cordeau, has been used with explosives generally.

Further, inserts of T. N. T. and widely spaced inserts of straight nitroglycerine dynamite have been suggested for gelatins, but only in the metal torpedoes and not in the paper wrapped factory packages of gelatin. It has been my experience that widely spaced inserts are not sufficient for severe conditions, and consequently my specification deals with cores, as distinguished from inserts. I advisedly use the term "core" as most correctly expressive because I desire my granular, non-gelatinized or semi-gelatinized dynamite to extend for more than 75% of the length of the gelatin, whereas I would consider inserts to mean some lesser condition.

However, my solution of the problem of successfully shooting deep well holes with cored high grade nitroglycerine content gelatinous explosives, which is the object of my invention, has never in my knowledge been proposed or used. It accomplishes a very important and practical purpose.

My gelatinous explosive may be in any diameter or length, provided that the core extends for more than 75% of the length of the gelatin. A core which extends throughout the entire length of the explosive is preferred, but any core which extends for over 75% of the length of the gelatin will produce substantially the full effect desired. While I find a core of approximately ½" in diameter or .196 sq. in. in cross sectional area to be suitable, it is to be understood that the invention is not limited with respect to the particular cross section or arrangement of the core nor to the cross sectional shape of said core. Any desired cross sectional shape may be employed, such as round, square, triangular or other polygonal shape. Irrespective of the shape employed, a cross sectional arrangement of approximately .196 sq. in. is found to be suitable although not limiting.

I prefer to have the core in the vicinity of the center of the gelatinous explosive because it is there best protected from water or oil and against handling hazards in cases where the core might be more sensitive to mechanical effects than the gelatinous explosive itself. In such a central position the core offers least resistance to the conformation of the gelatinous explosives to the torpedo or well hole. Further, it gives greatest assurance of the core lining up most effectively. However, the core may be in any desired position in the gelatinous explosive. For the best practical purposes I could make limitations as to the length of the core and to the position of the core, also as to whether it is parallel to or at any angle up to a right angle to the longitudinal axis of the gelatinous explosive. However, I know that my invention has more or less effectiveness under any of the conditions and full protection of my invention demands coverage of all forms.

While I have described gelatinous explosives containing 50% or more nitroglycerine or equivalent, it will be understood that any material which colloids the nitrocellulose or equivalent and thus forms a gelatinous explosive is within the scope of my claims.

Since the invention resides in the thought of providing a core of a less gelatinous nature than the main body of the explosive and one more resistant to being converted into a mass of high density under pressure, irrespective of the particular chemical composition of either the main body of explosive or the core, the invention goes even further than this in that it embodies the basic thought of providing a core in a charge for shooting deep wells which will preserve its qualities of aeration under pressure and/or under temperature changes to better advantage than the main body of the explosive whether either of these materials is gelatinous or not, and I wish to make it clear that I claim as my invention any combination of materials constituting a complete explosive charge likely to be adversely effected by deep well pressures or other deep well conditions and wherein there is provided a separate propagation core of a nature to be more resistant to being rendered of high density under such deep well conditions, than the main body of the charge.

I will cite some field observations to indicate the great benefits resultant from my invention. By the use of this cored gelatinous explosive the following points of superiority were observed in gas well blasting as compared to gelatinous explosives previously used in this work. That maximum explosive energy was obtained, was evidenced by the unusually large pieces of rock which were thrown forcibly from the well hole; that the element of brisance, or shattering action, was greater was indicated by a spray of fine flour-like dust which was brought out of the well hole by the gas for several hours following the shot; that the detonating wave propagated the entire length of the gelatinous explosive with a full rate of detonation was indicated by the steadily increasing volume of sound of the explosion; that a maximum volume of gas was generated by the explosive in a minimum amount of time was indicated by the increased height to which débris was thrown in the air by the explosion: that the shock imparted to the gas bearing strata was greater was indicated by a perceptibly increased earth tremor from the explosion; that the detonation of the entire length of gelatinous explosive took place in a shorter length of time was indicated by the rapidity with which the gas cooled down from the heat of detonation after the explosion. The volume of natural gas produced from wells blasted by this cored gelatinous explosive was more than was expected when judgment was based on production obtained by previously used gelatinous explosives.

The field tests were carried on under the observation of men who have spent their lives in drilling, shooting and operating gas and oil wells, and the foregoing statements of improved results represent the result of their observations of these actual tests.

Having described my invention what I claim is:

1. An explosive of the character described comprising a main body of gelatinous dynamite, and a core of less gelatinous and more granular dynamite therein and extending entirely therethrough, said core having a propagation sensitiveness materially in excess of that of the main charge under the conditions of use.

2. An explosive of the character described comprising a main body of gelatinous dynamite, and a core of less gelatinous and more granular dynamite therein and extending entirely therethrough, said core having a cross sectional area of approximately .196 sq. in.

3. An explosive of the character described comprising a main body of gelatinous dynamite, and a core of less gelatinous and more granular dynamite therein and extending substantially therethrough, said core having a propagation sensitiveness materially in excess of that of the main charge under the conditions of use.

4. An explosive of the character described containing a body of main high explosive material and a core of explosive propagation material therein of a nature to maintain its qualities of aeration more effectively under pressure than the material of the main charge, said core extending substantially throughout the length of the body of main high explosive material, said core being characterized by its main sensitizer being a highly sensitive liquid organic nitrate of the order of nitroglycerine.

5. An explosive of the character described comprising a body of main explosive of a gelatinous nature and a propagation core of an explosive material of a less gelatinous and more granular nature, said core extending throughout substantially the length of the main body of explosive and said core being characterized by having as its main sensitizer a highly sensitive liquid organic nitrate whereby said core is rendered of higher propagation sensitiveness than the main explosive when used under pressure.

6. An explosive of the character described comprising a main body of gelatinous dynamite, and a core or less gelatinous and more granular dynamite therein, said core extending for more than 75% of the length of the main body of gelatinous dynamite and having a propagation sensitiveness materially in excess of that of the main charge under the conditions of use.

7. An explosive of the character described containing a body of main high explosive material and a core of explosive propagation material therein of a nature to maintain its qualities of aeration more effectively under pressure than the material of the main charge, said core extending for more than 75% of the length of the main body of high explosive material and being characterized by its main sensitizer being a highly sensitive liquid organic nitrate of the order of nitroglycerine.

8. An explosive of the character described comprising a body of main explosive of a gelatinous nature, and a propagation core of an explosive material of a less gelatinous and more granular nature, said core extending for more than 75% of the length of the main body of explosive and being characterized by having as its main sensitizer a highly sensitive liquid organic nitrate whereby said core is rendered of higher propagation sensitiveness than the main explosive when used under pressure.

9. An article of manufacture comprising a unit of explosive having a main body of gelatinous dynamite, and a core of less gelatinous and more granular dynamite therein and extending substantially therethrough, said core having a propagation sensitiveness materially in excess of that of the main charge under the conditions of use.

10. An article of manufacture comprising a unit of explosive having a main body of gelatinous dynamite, and a core of less gelatinous and more granular dynamite extending for more than 75% of the length of the main body of gelatinous dynamite, said core having a propagation sensitiveness materially in excess of that of the main charge under the conditions of use.

11. An article of manufacture comprising a unit of explosive having a main body of gelatinous dynamite, and a core of less gelatinous and more granular dynamite extending entirely therethrough, said core having a propagation sensitiveness materially in excess of that of the main charge under the conditions of use.

12. An article of manufacture comprising a unit of explosive having a main body of high explosive material and a core of explosive propagation material therein of a nature to maintain its qualities of aeration more effectively under pressure than the material of the main charge, said core extending for more than 75% of the length of the main body of high explosive material and being characterized by its main sensitizer being a highly sensitive liquid organic nitrate of the order of nitroglycerine.

13. An article of manufacture comprising a unit of explosive having a main body of high explosive material and a core of explosive propagation material therein of a nature to maintain its qualities of aeration more effectively under pressure than the material of the main charge, said core extending substantially throughout the length of the main body and being characterized by its main sensitizer being a highly sensitive liquid organic nitrate of the order of nitroglycerine.

14. An elongated body of explosive for blasting well holes comprising a main body of gelatinous dynamite having less gelatinous and more granular dynamite of a higher propagation sensitiveness than the main body centrally located therein and extending for more than 75% of the length of said main body.

15. An explosive assembly for deep well blasting comprising an outer body of main explosive consisting of a gelatine dynamite and a propagation core housed therein and extending for more than 75% of the length of the outer body of main explosive and consisting of a dynamite having a higher propagation sensitiveness than a similar cross sectional area of the main explosive and wherein the proportions are such that the main explosive comprises at least 50% of the entire assembly.

16. A charge for deep well blasting comprising a main body of gelatine dynamite having straight nitroglycerine dynamite housed therein throughout at least 75% of the length of said main body, said main body of gelatine dynamite having no less than 50% nitroglycerine content.

17. An explosive of the character described containing a body of main explosive material and a core of explosive propagation material therein of a nature to maintain its qualities of aeration more effectively under pressure than the material of the main charge, said core extending for more than 75% of the length of the main body of high explosive material and being characterized by having as its main sensitizer nitroglycerine.

18. The herein described method of shooting deep wells which consists of exploding therein a charge consisting of a gelatinous main body of explosive, and a core of a less gelatinous and a more granular explosive, said core extending for more than 75% of the length of the main body of explosive and being characterized by its main sensitizer consisting of a highly sensitive liquid organic nitrate whereby said core is rendered of higher propagation sensitiveness than the main explosive under the conditions of pressure existing in deep wells.

JOHN M. JEFFRIES.